(12) United States Patent
Nakfoor

(10) Patent No.: US 6,496,809 B1
(45) Date of Patent: Dec. 17, 2002

(54) ELECTRONIC TICKETING SYSTEM AND METHOD

(76) Inventor: Brett Nakfoor, 145 W. Burton Pl., Chicago, IL (US) 60610-1309

( * ) Notice: Subject to any disclaimer, the term of this patent is extended or adjusted under 35 U.S.C. 154(b) by 0 days.

(21) Appl. No.: 09/590,455

(22) Filed: Jun. 9, 2000

(51) Int. Cl.⁷ .............................................. G06F 17/60
(52) U.S. Cl. ............................ 705/80; 705/37; 705/26; 705/65; 705/67; 235/382
(58) Field of Search ........................ 705/26, 27, 65, 705/67, 72, 76, 80, 13, 37; 235/380, 382, 382.5

(56) References Cited

U.S. PATENT DOCUMENTS

| | | | | |
|---|---|---|---|---|
| 5,243,331 A | * | 9/1993 | McCausland et al. | 345/172 |
| 5,598,477 A | * | 1/1997 | Berson | 380/51 |
| 5,724,520 A | * | 3/1998 | Goheen | 395/205 |
| 5,754,654 A | * | 5/1998 | Hiroya et al. | 380/24 |
| 6,023,685 A | | 2/2000 | Brett et al. | 705/37 |
| 6,067,532 A | * | 5/2000 | Gebb | 705/37 |
| 6,085,976 A | * | 7/2000 | Sehr | 235/380 |
| 6,107,932 A | * | 8/2000 | Walker et al. | 705/37 |
| 6,119,945 A | * | 9/2000 | Muller et al. | 235/380 |
| 6,173,209 B1 | * | 1/2001 | Laval et al. | 705/5 |
| 6,175,922 B1 | * | 1/2001 | Wang | 713/182 |
| 6,192,349 B1 | * | 2/2001 | Husemann et al. | 705/65 |
| 6,216,227 B1 | * | 4/2001 | Goldstein et al. | 705/65 |
| 6,223,166 B1 | * | 4/2001 | Kay | 705/26 |
| 6,240,396 B1 | * | 5/2001 | Walker et al. | 705/26 |
| 6,308,159 B1 | * | 10/2001 | Strohl | 705/5 |

FOREIGN PATENT DOCUMENTS

| | | | |
|---|---|---|---|
| EP | 0 428 233 A1 | * | 11/1990 |
| WO | WO99/60489 | * | 5/1998 |

OTHER PUBLICATIONS

TicketMaster Website, 1999–2000.*
Business Wire, "Acteva and Enspot.com sign agreement to provide online ticketing, broader distribution", p1248, Dialog file 621, Access No. 02248591, Dec. 1999.*
Business Week, "Will ticketmaster get scalped?: The justice dept. and rivals question its dominance", Dialog File 624, Access No. 0672094, Jun. 1995.*
Business Wire, "Tickets.com Announces Record First quarter revenues; ten–fold expansion in internet business . . . ", p0083, Dialog File 621, Access No. 02500747, May 2000.*
Anonymous, "Online Movie Ticket Site Launched in China", China Online, Dialog File 20:Dialog Global Reporter, Dec. 23, 1999.*
Anonymous, "Biometric Recognition is a Match Winner", Automatic ID News Europe, vol. 6, No. 7, Sep. 1997.*
Anonymous, "Keyware Unveils Multi–Application Smart Card Suite", Card News, vol. 16, Issue 10, May 30, 2001.*
Anonymous, "Acteva and Enspot.Com Sign Agreement to Provide On–Line Ticketingk, Broader Distribution", Business Wire, Dec. 3, 1999.*
Home page for: *eventlink* (www.eventpass.com); Sep. 8, 2000.

* cited by examiner

*Primary Examiner*—James P. Trammell
*Assistant Examiner*—John W. Hayes
(74) *Attorney, Agent, or Firm*—Wallenstein & Wagner, Ltd.

(57) ABSTRACT

The present disclosure provides a method of electronically exchanging tickets for an event in a secondary market from ticket sellers to ticket buyers located at remote terminals. The method comprises associating the tickets with authentication data of the ticket seller, receiving from ticket sellers electronic asks comprising an ask quantity and an ask price, receiving from a ticket buyer an electronic bid comprising a bid quantity and a bid price, comparing the bid to the asks, completing a transfer of the tickets when the bid price equals the ask price and the ask quantity is equal to or greater than the bid quantity, and reassociating the tickets with authentication data of the ticket buyer. Also disclosed is a system for performing the method.

17 Claims, 4 Drawing Sheets

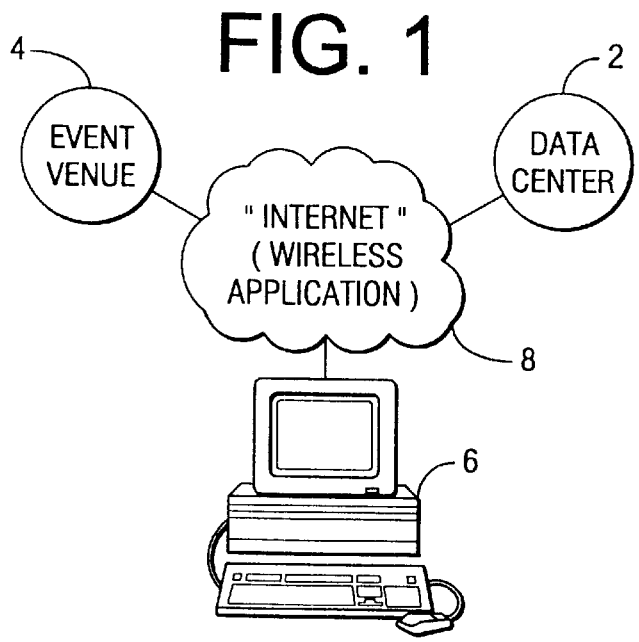
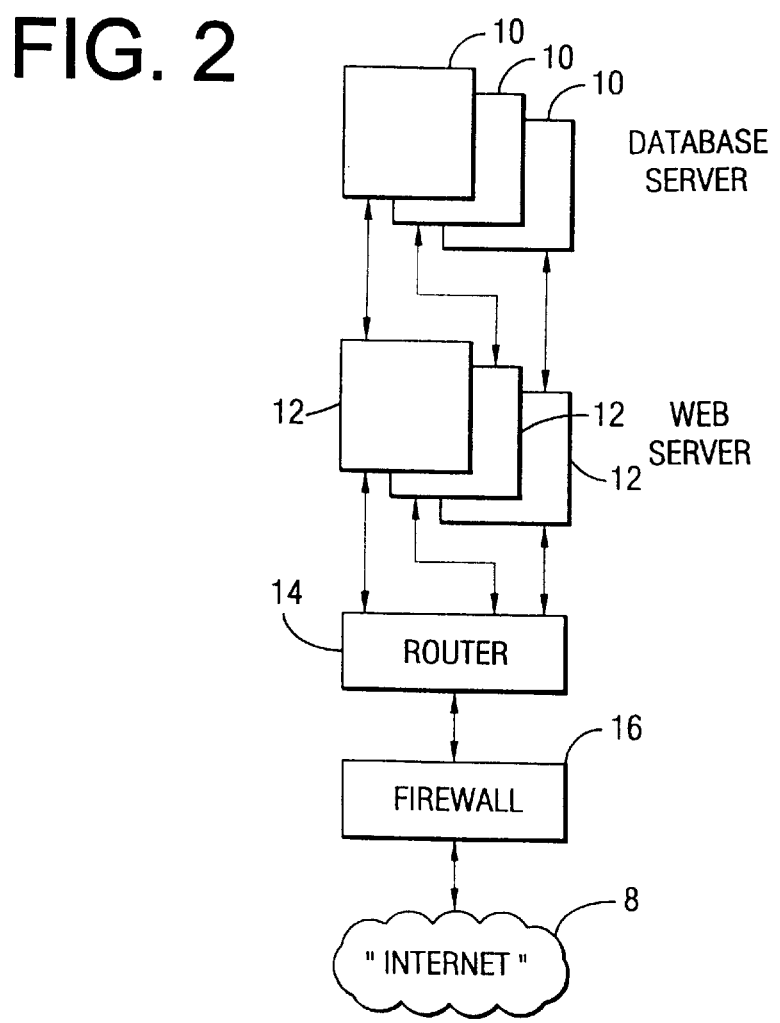

ELECTRONIC TICKETING SYSTEM AND METHOD

TECHNICAL FIELD

The present invention relates to a system and method for real-time sales and distribution of tickets.

BACKGROUND OF THE INVENTION

Paper tickets are widely used to grant access to patrons to sporting and general entertainment events. The ticket is a contract which grants the holder the right to attend the event and, normally, to sit in a particular seat. By transferring possession of the physical ticket, a ticketholder has transferred the right to attend the event.

However, many problems are associated with the transfer of paper tickets. In order to issue the ticket, the event promoter must organize the delivery of thousands of tickets. Additionally, if a purchaser wishes to transfer the ticket to a subsequent purchaser, the buyer and seller must be geographically proximate to physically transfer the ticket. With the advent of the Internet, buyers and seller have been able to locate each other in order to transfer tickets. However, the paper ticket still stands as an impediment to the efficient transfer of the right to attend an event because the seller must ship the ticket to the seller. By shipping the ticket the buyer and seller incur additional costs and require a greater lead time to allow the transfer to occur before the event. Each party must also have enough trust that the other party will deliver as agreed. Frequently, because of the impediments of sale, tickets are not widely transferred by geographically remote buyers and sellers.

Another type of impediment stands in the way of the efficient transfer of tickets. Most states have laws which prevent the sale of tickets for more than the face value of the ticket unless the seller has the consent of the event sponsor. To sell the ticket above face value, it is impractical for an individual seller to attempt to obtain permission from an event sponsor prior to selling a ticket. Because an event sponsor makes no money on the transaction, it has very little incentive to grant consent.

In a few other states laws allow a ticket broker to sell tickets at a price above the face value of the ticket, but not buy tickets above face value. Therefore, ticket brokers must obtain a ticket at the face value from the event sponsor and resell the ticket at a higher price. The ticket broker is violating the law if he purchases the ticket at a higher value from someone who is not a ticket broker. Finally, the ticker broker must still physically transfer the ticket to the buyer.

The present invention is a system and method which provides a legal, efficient way to transfer the right to attend an event at the market value of that right and to determine the market value. The present invention eliminates the disadvantages of the prior art.

SUMMARY OF THE INVENTION

The present disclosure provides a method of electronically exchanging tickets for an event in a secondary market from ticket sellers to ticket buyers located at remote terminals. The method comprises associating the tickets with authentication data of the ticket seller, receiving from ticket sellers electronic asks comprising an ask quantity and an ask price, receiving from a ticket buyer an electronic bid comprising a bid quantity and a bid price, comparing the bid to the asks, completing a transfer of the tickets when the bid price equals the ask price and the ask quantity is equal to or greater than the bid quantity, and reassociating the tickets with authentication data of the ticket buyer. Also disclosed is a system for performing the method.

BRIEF DESCRIPTION OF THE DRAWINGS

FIG. 1 is a diagram of the system according to an embodiment of the present invention;

FIG. 2 is a diagram of a data center according to an embodiment of the present invention;

DETAILED DESCRIPTION OF THE PREFERRED EMBODIMENT

Figure 3:
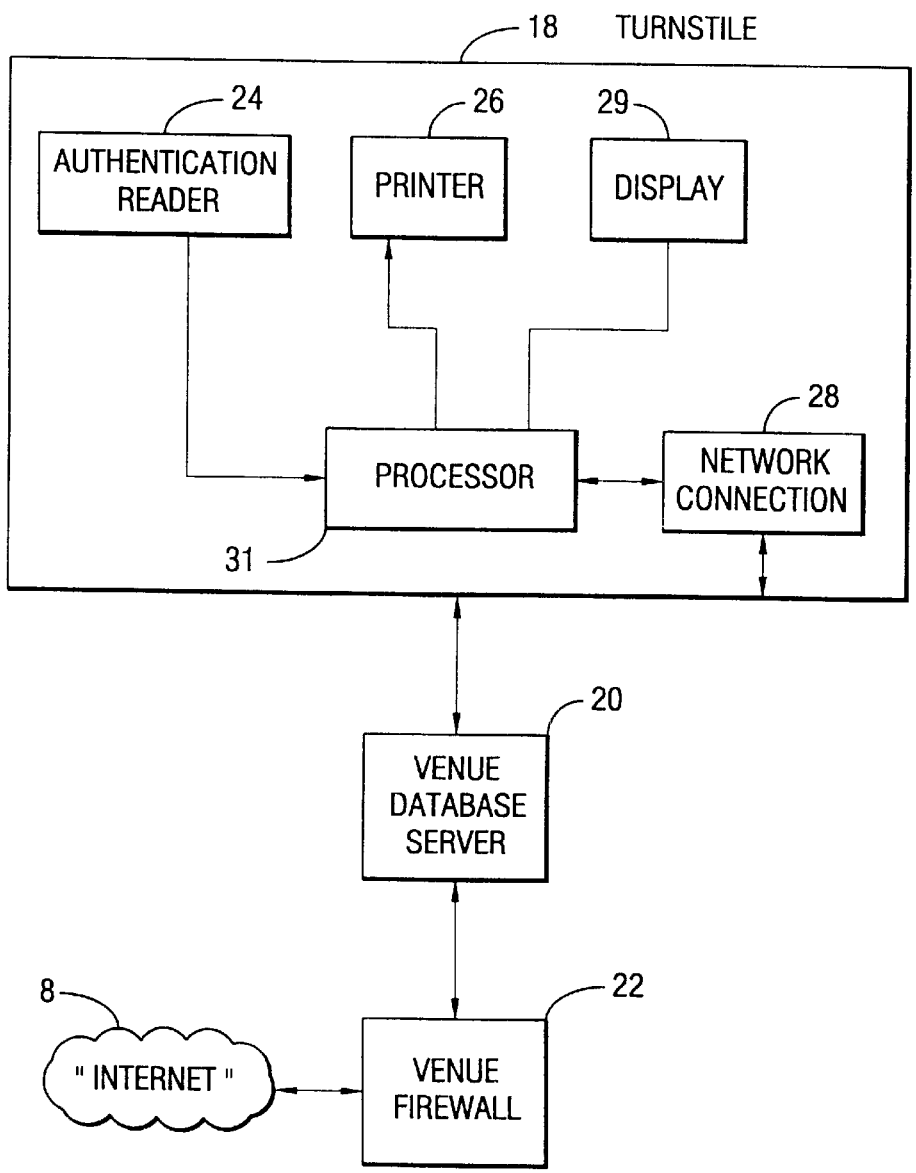
FIG. 3 is a diagram of a venue according to an embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the system architecture of the preferred embodiment of the present invention is implemented in three types of locations: a data center 2, a plurality of venues 4, and a plurality of terminals 6. The data center 2 is in communication with each venue 4 and each terminal 6 through the Internet or any Wireless Application 8. The terminals 6 can be any device through which a user can access a website, for example: a personal computer, a personal digital assistant, an Internet-through-television device, or any type of many available wireless devices available in the market.

Referring to FIG. 2, the data center 2 preferably comprises database servers 10, web servers 12, a load balancing router 14 and a firewall 16 connected to the Internet 8. The firewall 15 receives messages from the Internet 8 and forwards the messages to the load balancing router 14 and likewise receives messages from the load balancing router 14 and forwards them to the Internet 8. The firewall 16 preferably performs a number of filtering functions and network address translation in order to safeguard the data center 2 from unauthorized access. The firewall 16 also preferably encrypts the messages using known public key/private key encryption methods. The load balancing router 14 forwards messages received from the firewall 16 and forwards the messages to one of the plurality of web servers 12. The load balancing router 14 also forwards messages received from the web servers 12 to the firewall 16. In this manner, the load balancing router 14 distributes tasks to be performed to one of the plurality of web servers 12 in order to distribute processing demands. The web servers 12 access the database servers 10 to retrieve and store information in response to received messages from the terminals 6 and transmits reply messages to the terminals 6. The database servers 10 store data tables which contain information about various venues, events, ticket resources, user roles, ticket status, ticket holders and ticket bidders, as will be explained in greater detail below.

Referring to FIG. 3, within each venue 4 are a plurality of turnstiles 18, a venue database server 20 and venue firewall 22 connected to the Internet 8 for communicating to the data center 2. The turnstile 18 of the venue 4 comprises an authentication reader 24, a printer 26, a network connection 28, a display 29 and a processor 31. The authentication reader 24, a printer 26, a network connection 28 and display 29. The authentication reader 24 is preferably a magnetic card reader. However, other types of cards may be used, such as cards incorporating single- or multi-dimensional bar codes or wireless methods of communication, without departing from the scope of the present invention. The network connection 28 allows the turnstile 18 to communicate with the venue database server 20 in order to provide information about the card being scanned and to receive information about whether to grant or deny entry to the venue 4. The turnstile 18 preferably is a compact unit which runs from embedded software within the turnstile or from a server locates on site or remotely 18. While the turnstile 18 is described as being connected with the venue database server 20 with a wire, one of ordinary skill in the art can easily recognize that communication between the turnstile and database server can be implemented by radio frequency, optical communication or any other method of wireless communication without departing from the scope of the present invention. The venue database server 20 maintains a record of the tickets have been sold, the ticketholders have passed through the turnstile 18 and which ticketholders have not yet arrived. The database server is preferably a computer running UNIX, Windows NT, Java or Sparc and having an Oracle, Informix, Sysbase or SQL Server database.

In order to implement the present invention, an end user can access the data center 2 by using a standard web browser on the terminal 6. However, non-standard, custom software can also be implemented or web browser software on a wireless device, such as a personal digital assistant. Terminals 6 can log into the data center 2 to view events which will take place in the future, purchase tickets in the primary market from the event sponsor, offer tickets for sale in the secondary market, purchase tickets in the secondary market and purchase merchandise or services related to the event. When the user has entered the appropriate address of a desired data center 2, for example an online tickets web page, the user can view a calender of events to search for a desired event or choose a venue to see what events will be appearing at the venue in the future. After selecting an event which the user desires to attend, the user may purchase tickets for the event from the event sponsor. Additional products and services can also be offered at the time of ticket sales. After the ticket is sold and before the time of the event, the ticket can be transferred by the ticket owner to subsequent ticket buyer.

Figure 4:
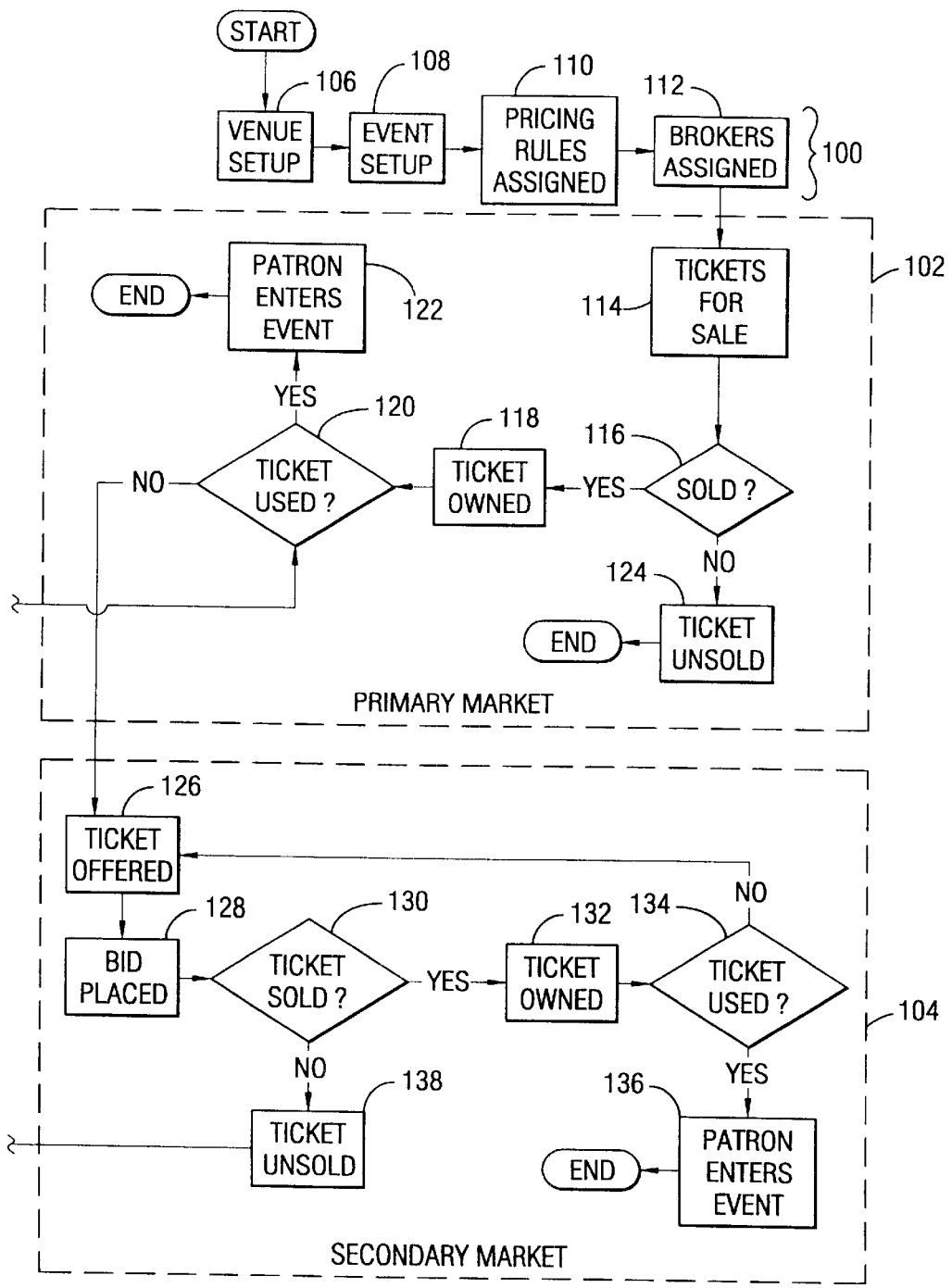
FIG. 4 is a flow chart describing the steps of an embodiment of the present invention.

Referring to FIG. 4, the ticket has a determined life cycle which is tracked by the system of the present invention. The steps of the life cycle are: ticket setup 100, primary market 102 and secondary market 104. In the ticket setup step the ticket is assigned a venue 106, an event 108 and ticket pricing rules 110 are associated with the ticket. Additionally, brokers may be assigned to the ticket 112 in order to transfer the ticket in a multi-broker environment. In the primary market step 114 the ticket is offered for sale. If the ticket is sold 116, the ticket becomes an "owned ticket" 118. If the ticket is used 120 by the person it is sold to, the patron is allowed to enter the event 122 and the tickets life cycle ends in the primary market. If the ticket is not sold before the time of the event 124, the ticket's life cycle ends having been unsold in the primary market.

If the ticket is not used in the primary market, it may be traded in the secondary market 126. There is no limit how many times the ticket may be traded in the secondary market before the time of event. Many options are available for sales of tickets in the primary and secondary market. Sales of tickets can be made using traditional methods, such as by offering a ticket for a fixed price or a scaled price (i.e. student and senior citizen discounts). Tickets can also be offered using a non-traditional format such as in an auction-type format, a reverse auction-type format or in an exchange-type format. In an auction-type format, event sponsors can place groups of tickets on sale and sell them to highest bidder after a fixed period of time. Many different options are available for the auction-type format, such as allowing users to place bids for groups of tickets. If the user's bid cannot be satisfied at the present price for all seats, the bid fails. Alternatively users can place a bid for which, if the bid cannot be fulfilled for the quantity of seats of the bid, the number of seats in the bid is reduced. {Any other variations which can be considered}. Using the auction type format, the event sponsor realizes the maximum profit for the event because tickets are sold for their true market value. A reverse auction type format is similar to an auction-type format with the caveat that the event sponsor "bids" to sell the ticket rather than users bidding for the right to buy the ticket.

In an exchange type format, tickets are sold in the primary market by event sponsors who advertise an ask price for a particular ticket. At the same time, users advertise a bid price in order to purchase a particular ticket in a particular section of the venue. Both the ask price and the bid price remain valid for a particular period of time. If the ask price advertised by event sponsors is higher than the bid price advertised by any particular user, no ticket is sold. However, the moment a bid price equals an ask price, a sale of a ticket is made. Additionally, bids can specify quantities of contiguous seats as well as a bid price. In a like manner, event sponsors can specify quantities of contiguous seats along with the ask price. An event sponsor may wish to specify a minimum number of contiguous tickets to prevent large blocks of seats from being broken up or to force the sale of an exact number of number of seats in order to prevent a single seat in a block from block from being unsold (i.e. to prevent selling two seats of a block of three unsold seats). An event sponsor may wish to specify a maximum number of seats in order to prevent When a user's bid price equals and quantity of seats for an event equals a sponsor's ask price and is within the sponsor's minimum and maximum quantity of seats, a sale is made. Therefore, the main difference between an auction type format or a reverse auction-type format is that sales are made instantaneously when a bid price equals an ask price for a ticket.

Alternatively, for different classes of seating at the venue, a combination of sales formats can be implemented. For example, for a sporting event, seats which have the best view, such as box seats and luxury boxes, an event sponsor can implement a non-traditional format which seeks to secure the highest market price and implement a traditional format of ticket sales for the remaining seats. Also, tickets may be sold in the primary market by a particular method and sold in the secondary market by a another method. Tickets may also be sold in the primary market by one method and sold in the secondary market by one of multiple available methods.

During the step of offering the ticket 126, a price is associated with the ticket. Depending on the format the price has a different significance. For example, the price may be a first bid price or, in an exchange type format, the price may be an ask price. Next bids are placed on the ticket 128 until the ticket is sold 130. If the ticket is sold the ticket is now owned by the new buyer 132 who may use the ticket and enter the event 136 or offer the ticket for resale 126. If the ticket remains unsold 138, the ticket may be used in the primary market 120. Additionally, unsolicited bids can be placed for a ticket. Anyone seeking to buy a ticket can specify the price at which he or she is willing to buy and wait to see if a ticket owner is willing to sell at that price.

Each time a ticket is transferred new ownership information is associated with the ticket. Ownership information could be credit card numbers used to purchase the ticket, a cell phone number, a digital encryption on a personal digital assistant, or a single- or multi-dimensional bar code. The two dimensional bar code can be printed by the user in order to provide a physical indication of ticket ownership. In order to provide an incentive for event sponsors to grant permission to sell the tickets in the secondary market, the present system provides that for sales in the secondary market the event sponsor will receive a royalty. Royalties can be a flat fee or a fee based on the sales price of the ticket in the secondary market.

Figure 5:
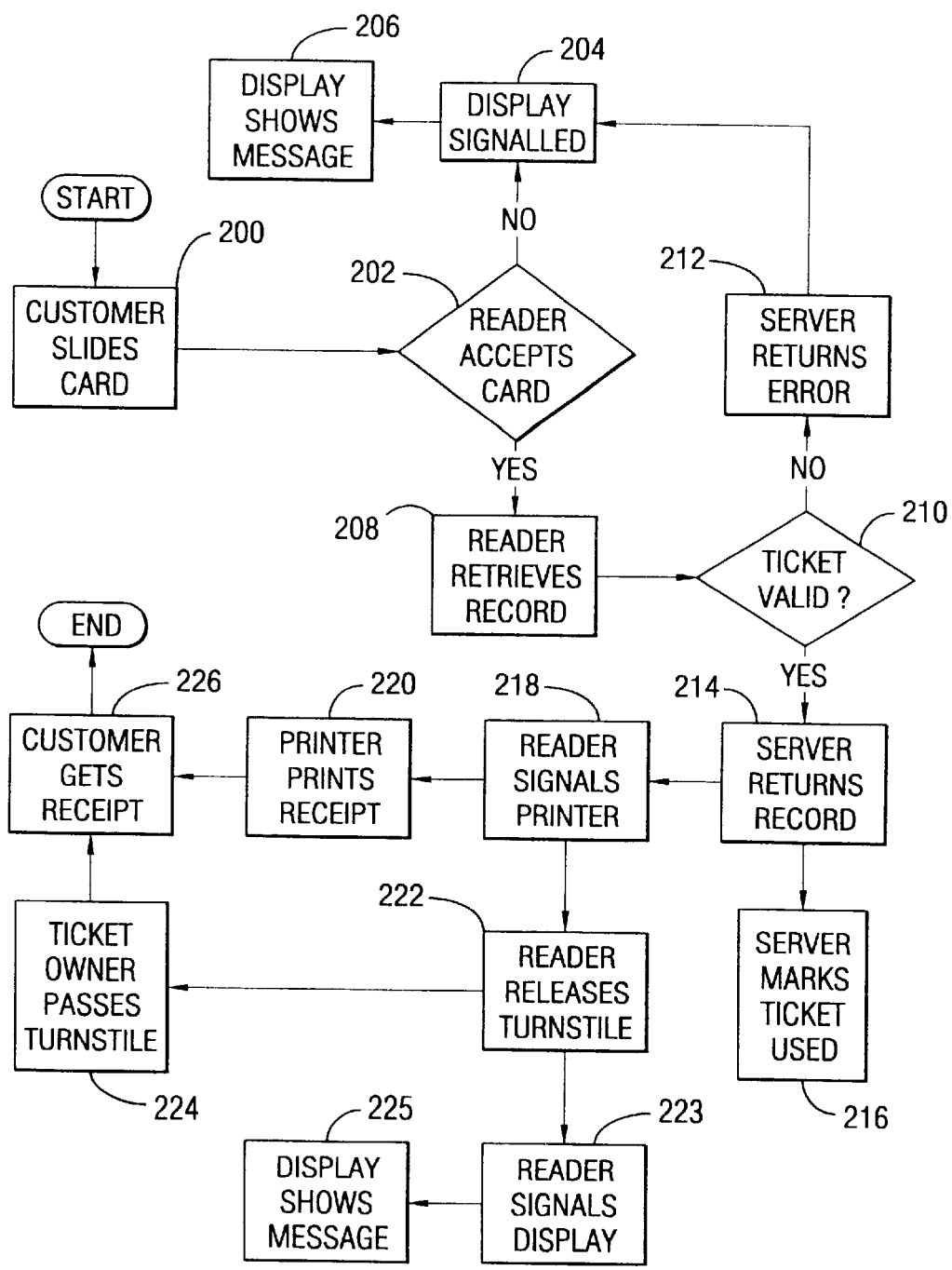
FIG. 5 is a flow chart describing the steps of an embodiment of the present invention.

Referring to FIG. 5, upon arriving at the venue to attend an event, the ticket owner authenticates himself to the event sponsor in order to gain entry to the venue. Authentication can occur in a variety of ways including infra-red wireless scanning. In one example, the ticket owner slides the credit card 200 associated with the ticket through the authentication reader 24 on a turnstile 18. Alternative methods for authentication could be implemented such as bar coded authentication tickets, as described above. If the authentication reader 24 unsuccessfully scans the authentication 202, the reader signals the display 204 to indicate that the authentication was not successfully scanned 206. If the authentication is successfully scanned the reader queries the venue database server 20 the determine whether the ticket is valid 210. If the ticket is not valid, the venue database server 20 returns an error 212 and the display is signaled 204 and message displayed 206. If the ticket is valid, the venue database server 20 returns a message indicating the ticket is valid 214.

Next, the venue database server 20 marks the ticket as used 216 within the database and signals the printer 26 to print a receipt 216 and the printer responds by printing a receipt 218. The authentication reader 24 also releases the turnstile 18 (step 222) and signals the display 223 which displays a message 225. Next, the ticket owner passes through the turnstile 224 to allow the ticket owner to enter the venue 4.

In order to implement the present system, user roles are implemented, such as: venue management, event management, event marketing, ticket owner, ticket buyer and administration. The roles may interact with the system in order to fulfill necessary tasks by either using terminals 6 connected via the Internet 8 or directly to the data center 2 or venue 4. A user fulfilling a venue management role can enter information regarding the venue such as seating charts, directions to the venue and entrance gate information. A user fulfilling an event management role can enter information about an event to take place at the venue, such as the name, time, date, seating configuration of the venue, ticket pricing for the event and merchandise to be offered to ticket purchasers. A user fulfilling an event marketing role can enter information pertaining to products and services that are offered to users upon offer or completion of a ticket sale. A user fulfilling the role of a ticket owner can enter information regarding the price (first auction bid or ask price, as appropriate) and identity of the ticket or tickets. A user fulfilling the role of ticket buyer can enter information regarding the quantity and price (an "auction bid" price or an "exchange bid," as appropriate). A user fulfilling the role of administrator preferably has the rights of all roles and any additional task necessary for maintenance of the system. While the specific embodiments have been illustrated and described, numerous modifications come to mind without significantly departing from the spirit of the invention and the scope of protection is only limited by the scope of the accompanying claims.

I claim:

1. A system for electronically exchanging paperless tickets for an event in a secondary market from ticket sellers to ticket buyers, the system comprising:
   means for associating the paperless tickets with authentication data of the ticket seller;
   means for receiving from ticket sellers electronic asks comprising an ask quantity and an ask price;
   means for receiving from a ticket buyer an electronic bid comprising a bid quantity and a bid price;
   means for comparing the bid to the asks;
   means for completing a transfer of the paperless tickets when the bid price equals the ask price and the ask quantity is equal to or greater than the bid quantity;
   means for reassociating the paperless tickets with authentication data of the ticket buyer, the authentication data of the ticket buyer being provided by the ticket buyer, and wherein the authentication data does not constitute a physical material; and
   means for granting access to the event upon presentation of the buyer authentication data of the paperless ticket without the buyer presenting any Personalized physical material.

2. The system of claim 1 wherein the means for granting access to the event comprises an access device operably connected to the system.

3. The system of claim 2 wherein the access device comprises an authentication reader for confirming ticket ownership.

4. The system of claim 3 wherein the authentication reader is a wireless device.

5. The system of claim 1 wherein the step of associating the tickets with authentication data of the ticket seller is preceded by the step of selling the ticket in the primary market.

6. A method of electronically exchanging paperless tickets for an event in a secondary market from ticket sellers to ticket buyers, the method comprising the steps of:
   associating the paperless tickets with authentication data of the ticket seller;
   receiving from ticket sellers electronic asks comprising an ask quantity and an ask price;
   receiving from a ticket buyer an electronic bid comprising a bid quantity and a bid price;
   comparing the bid to the asks;
   completing a transfer of the paperless tickets when the bid price equals the ask price and the ask quantity is equal to or greater than the bid quantity;
   reassociating the paperless tickets with authentication data of the ticket buyer, the authentication data of the ticket buyer being provided by the ticket buyer, and wherein the authentication data does not constitute a physical material; and
   presenting authentication data of the ticket buyer at an access device operably connected to the system without the buyer presenting any personalized physical material.

7. The method of claim 6 wherein the access device comprises an authentication reader.

8. The method of claim 6 wherein the access device is a wireless device.

9. The method of claim 6 wherein the step of associating the paperless tickets with authentication data of the ticket seller is preceded by the step of selling the paperless ticket in the primary market.

10. A system for electronically exchanging paperless tickets for an event in a secondary market from ticket sellers to ticket buyers, the system comprising:

a data center which associates the paperless tickets with authentication data of a ticket seller, the data center further being adapted to receive from ticket sellers electronic asks comprising an ask quantity and an ask price, and to receiving from a ticket buyer an electronic bid comprising a bid quantity and a bid price, compares the bid to the asks, completes a transfer of the paperless tickets when the bid price equals the ask price and the ask quantity is equal to or greater than the bid quantity, reassoicates the paperless tickets with authentication data of the ticket buyer, the authentication data being provided by the ticket buyer, and wherein the authentication data does not constitute a physical material, and allows access to the venue upon presentation of the buyer authentication data to an access device operably connected to the data center without the buyer presenting any personalized physical material.

11. The system of claim 10 wherein the access device comprises an authentication reader for confirming ticket ownership.

12. The system of claim 11 wherein the authentication device is a wireless device.

13. The method of claim 10 wherein data center, before associating the tickets with authentication data of the ticket seller, sells the ticket in the primary market.

14. A system for electronically exchanging paperless tickets for an event from a ticket seller to a ticket buyer, the system comprising:

a primary market for the event having a paperless ticket, and each paperless ticket is associated through authentication data to a primary market owner;

the paperless ticket having a primary market price responsive to a secondary market;

the secondary market having a secondary market owner of the paperless ticket;

means for associating the paperless ticket with the authentication data of the secondary market owner of the paperless ticket;

means for receiving from secondary market event ticket owner electronic asks comprising an ask quantity and an ask price;

means for receiving from a secondary market event ticket buyer an electronic bid comprising a bid quantity and a bid price;

means for comparing a bid to the asks;

means for completing a transfer of the paperless ticket at a secondary market price wherein the bid price equals the ask price and the ask quantity is equal to or greater than the bid quantity;

means for reassociating the secondary market paperless ticket through authentication data to the secondary market paperless ticket buyer, the authentication data associated with the secondary market paperless ticket buyer being provided by the secondary market paperless ticket buyer, and wherein the authentication data does not constitute a physical material;

means for granting access to the event upon presentation of the authentication data associated with the secondary market paperless ticket without the buyer presenting any personalized physical material; and means for adjusting the primary market price in response to the secondary market price.

15. The system of claim 14 wherein the means for granting access to the event comprises an access device operably connected to the system.

16. The system of claim 15 wherein the access device comprises an authentication reader for confirming ticket ownership.

17. A method of electronically exchanging paperless tickets for an event from a ticket seller to a ticket buyer, the method comprising the steps of:

selling a paperless ticket in a primary market to a primary market buyer at a primary market price, and the primary market price being responsive to a secondary market price for the paperless ticket;

associating the paperless ticket with authentication data of a secondary market seller of the paperless ticket;

receiving from the secondary market paperless ticket seller electronic asks comprising an ask quantity and an ask price;

receiving from a secondary market paperless ticket buyer an electronic bid comprising a bid quantity and a bid price;

comparing the bid price to the ask price;

completing a transfer of the paperless ticket at a secondary market price wherein the bid price equals the ask price and the ask quantity is equal to or greater than the bid quantity;

reassociating the paperless ticket through authentication data to the secondary market event paperless ticket buyer, the authentication data associated with the secondary market paperless ticket buyer being provided by the secondary market paperless ticket buyer, and wherein the authentication data does not constitute a physical material;

granting access to the event upon presentation of the authentication data associated with the secondary market paperless ticket at an access device operably connected to the system without the buyer presenting any personalized physical material; and adjusting the primary market price in response to the secondary market price of the paperless ticket.

* * * * *